United States Patent
Ito

(10) Patent No.: US 11,384,954 B2
(45) Date of Patent: Jul. 12, 2022

(54) DATA COLLECTING DEVICE, DATA COLLECTING SYSTEM, CONTROL METHOD AND PROGRAM

(71) Applicant: Mitsubishi Electric Corporation, Tokyo (JP)

(72) Inventor: Takahiro Ito, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/959,182

(22) PCT Filed: Feb. 6, 2018

(86) PCT No.: PCT/JP2018/004084
§ 371 (c)(1),
(2) Date: Jun. 30, 2020

(87) PCT Pub. No.: WO2019/155532
PCT Pub. Date: Aug. 15, 2019

(65) Prior Publication Data
US 2020/0340705 A1    Oct. 29, 2020

(51) Int. Cl.
*F24F 11/80* (2018.01)
*G06F 16/23* (2019.01)
*G05B 19/042* (2006.01)

(52) U.S. Cl.
CPC ............ *F24F 11/80* (2018.01); *G05B 19/042* (2013.01); *G06F 16/2379* (2019.01); *G05B 2219/2614* (2013.01)

(58) Field of Classification Search
CPC . F24F 11/80; F24F 11/30; F24F 11/62; G05B 2219/2614; G05B 19/042; G05B 15/02; G06F 16/2379
See application file for complete search history.

(56) References Cited

U.S. PATENT DOCUMENTS

2008/0023778 A1    2/2008 Millet
2008/0028778 A1*   2/2008 Millet .................... G06F 1/206
62/129
(Continued)

FOREIGN PATENT DOCUMENTS

JP    H10-190487 A    7/1998
JP    2003-347993 A   12/2003
(Continued)

OTHER PUBLICATIONS

Office Action dated Jun. 22, 2021, issued in corresponding JP Patent Application No. 2019-570182 (and English Machine Translation).
(Continued)

*Primary Examiner* — Rocio Del Mar Perez-Velez
*Assistant Examiner* — Alicia M. Choi
(74) *Attorney, Agent, or Firm* — Posz Law Group, PLC

(57) ABSTRACT

A management device estimates an air temperature inside a data collection apparatus as an estimated air temperature, based on operation data received from an air conditioner and meteorological data received from a server via a communication device. When the estimated air temperature is higher than an operable temperature of the communication device, the management device performs control to decrease the air temperature inside the data collection apparatus. When a ventilation-in-progress air temperature is higher than the operable temperature of the communication device, the management device transmits to a breaker device a command to stop the communication device, thereby decreasing the air temperature inside the data collection apparatus. When the ventilation-in-progress air temperature is lower than or equal to the operable temperature of the communication device, the management device transmits to the breaker device a command to run the ventilation device,
(Continued)

thereby decreasing the air temperature inside the data collection apparatus.

7 Claims, 6 Drawing Sheets

(56) References Cited

U.S. PATENT DOCUMENTS

| | | | | |
|---|---|---|---|---|
| 2011/0046789 | A1* | 2/2011 | Vanheerden | G05B 15/02 700/275 |
| 2012/0053734 | A1 | 3/2012 | Kazama et al. | |
| 2016/0103475 | A1* | 4/2016 | Lee | G06F 1/3206 700/291 |
| 2017/0257497 | A1* | 9/2017 | Ono | H04N 1/00323 |
| 2018/0003186 | A1* | 1/2018 | Matsuura | G06F 1/3234 |
| 2018/0107196 | A1* | 4/2018 | Bian | G05B 19/4183 |
| 2018/0275692 | A1* | 9/2018 | Lattanzio | G01K 13/00 |
| 2020/0124312 | A1* | 4/2020 | Brockway | F24F 3/14 |

FOREIGN PATENT DOCUMENTS

| | | | | |
|---|---|---|---|---|
| JP | 2004-263989 | A | 9/2004 | |
| JP | 2008-225590 | A | 9/2008 | |
| JP | 2009-015546 | A | 1/2009 | |
| JP | 4882936 | B2 * | 2/2012 | G01D 11/24 |
| JP | 2012-093851 | A | 5/2012 | |
| JP | 5123550 | B2 * | 1/2013 | G01D 9/00 |
| JP | 2014-182642 | A | 9/2014 | |
| JP | 2017-053677 | A | 3/2017 | |

OTHER PUBLICATIONS

International Search Report dated Apr. 17, 2018 issued in the corresponding International Application No. PCT/JP2018/004084 (and English translation).
Examination Report No. 1 dated Feb. 3, 2021, issued for the corresponding AU patent application No. 2018408565.
Extended European Search Report dated Jan. 20, 2021 issued in Corresponding EP Patent Application 18904961.2.
Office Action dated Oct. 14, 2021, issued in corresponding IN Patent Application No. 202027028505 (and English Machine Translation).
Office Action dated Jan. 27, 2022, issued in corresponding JP Patent Application No. 2019-570182 (and English Machine Translation).

* cited by examiner

US 11,384,954 B2

DATA COLLECTING DEVICE, DATA COLLECTING SYSTEM, CONTROL METHOD AND PROGRAM

CROSS REFERENCE TO RELATED APPLICATION

This application is a U.S. national stage application of PCT/JP2018/004084 filed on Feb. 6, 2018, the contents of which are incorporated herein by reference.

TECHNICAL FIELD

The present disclosure relates to a data collection apparatus, a data collection system, a control method and a program.

BACKGROUND ART

Collection of operation data of a facility device and utilization of the collected data for, for example, management of the facility device or analysis of usage of the facility device, are performed in recent years. Patent Literature 1 discloses a method for providing a management device by packaging in a box a plurality of element devices to be used for management of a facility equipment. According to the management system disclosed in Patent Literature 1, the above-described management device collects operation data of the facility device and transmits the operation data to a higher-level device.

Heat permeates the interior of a device in which a plurality of element devices is packaged and thus may cause erroneous operation. Patent Literature 2 discloses a method of controlling operation of a device by installing a temperature sensor in the device and monitoring air temperature inside the device by use of the temperature sensor.

CITATION LIST

Patent Literature

Patent Literature 1: Unexamined Japanese Patent Application Publication No. 2014-182642
Patent Literature 2: Unexamined Japanese Patent Application Publication No.

SUMMARY OF INVENTION

Technical Problem

When the method of Patent Literature 2 is applied to the management device disclosed in Patent Literature 1, there arises a problem that the temperature sensor is required to be installed in the device, and accordingly, installation of an interface for connection of the temperature sensor to the element devices is required.

In view of the above-described circumstances, an objective of the present disclosure is to provide a data collection apparatus that can control an air temperature inside the apparatus without installation of a temperature sensor in the apparatus.

Solution to Problem

To achieve the aforementioned objective, a data, collection apparatus according to the present disclosure is a data collection apparatus for collecting operation data of an air conditioner, and includes:

estimation means for estimating an air temperature inside the data collection apparatus as an estimated air temperature; and temperature control means for decreasing the air temperature inside the data collection apparatus when the estimated air temperature is higher than a reference value.

Advantageous Effects of Invention

According to the present disclosure, the air temperature inside the data collection apparatus is estimated as an estimated air temperature, and when the estimated internal air temperature is higher than a reference value, the air temperature inside the data collection apparatus is decreased. This enables control of the air temperature inside the data collection apparatus without installation of a temperature sensor in the data collection apparatus.

DESCRIPTION OF EMBODIMENTS

Figure 1:
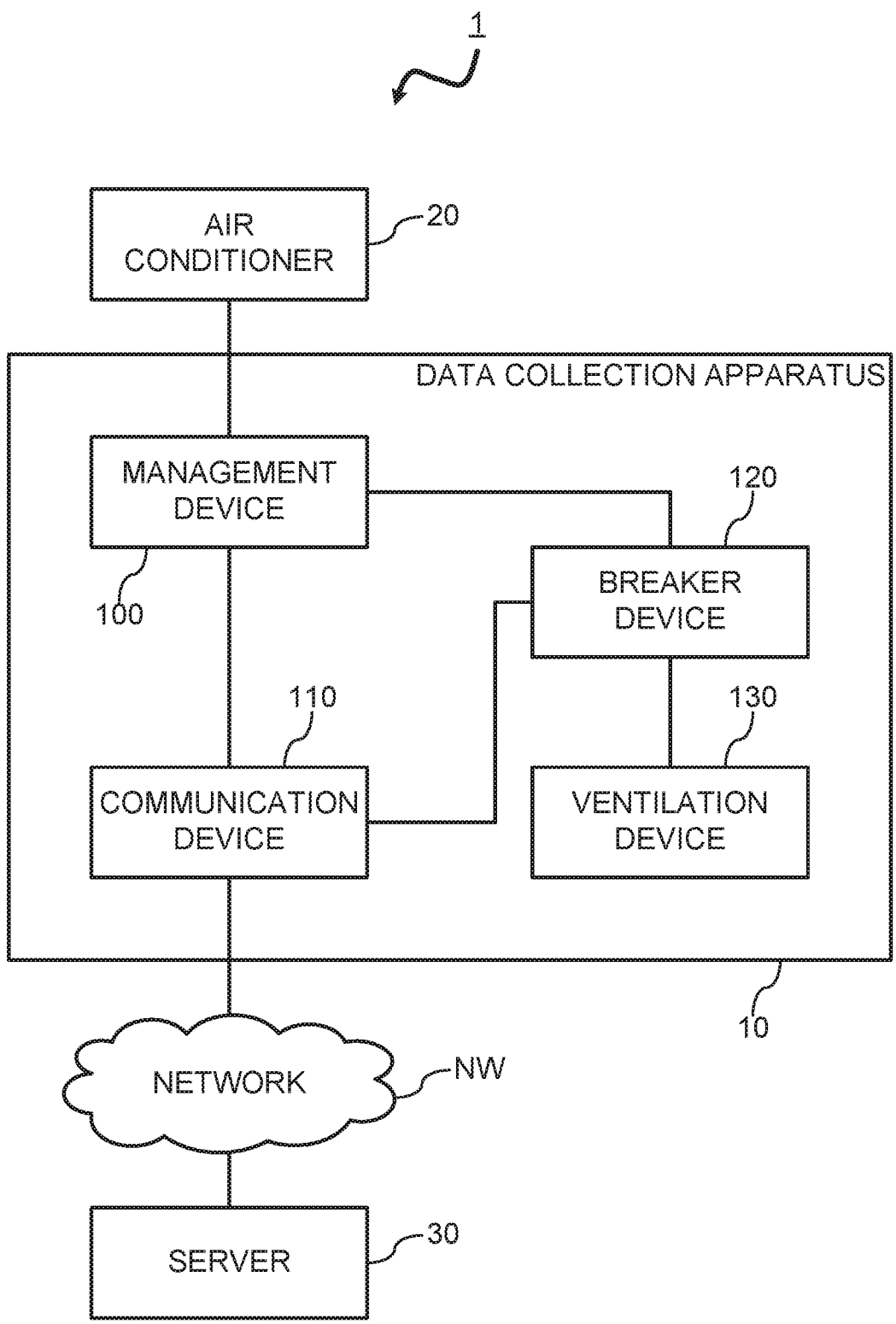
FIG. 1 illustrates a configuration of a data collection system according to an embodiment of the present disclosure.

Hereinafter, a data collection system according to an embodiment of the present disclosure is described with reference to the drawings. In the drawings, the same reference signs are given to the same or equivalent parts.

Embodiment

A data collection system 1 according to an embodiment is described with reference to FIG. 1. The data collection system 1 includes a data collection apparatus 10, an air conditioner 20, and a server 30 that is connected to the data collection apparatus 10 via a network NW.

In the data collection system 1, the data collection apparatus 10 collects operation data of the air conditioner 20 and transmits the collected operation data to the server 30. This enables, for example, management of the air conditioner 20 and analysis of usage of the air conditioner 20.

The data collection apparatus 10 collects and stores the operation data of the air conditioner 20. The data collection apparatus 10 transmits the stored operation data to the server 30. The operation data is data relating to the air conditioner, such as room temperature data indicating a room temperature of a room in which an indoor unit is installed, temperature data indicating an outside temperature around an installation position of an outdoor unit, data indicating an operation mode, and data indicating operating time period. The room temperature data and the outdoor temperature data are used to perform temperature estimation described later.

The data collection apparatus 10 includes a management device 100, a communication device 110, a breaker device 120, and a ventilation device 130. The management device 100 is connected to the communication device 110, the breaker device 120, and the air conditioner 20. The communication device 110 is connected to the management device 100 and the breaker device 120, and is connected to the server 30 via the network NW. The ventilation device 130 is connected to the breaker device 120. Each device included in the data collection apparatus 10 is described later in detail.

The data collection apparatus 10 is configured by housing in a box the management device 100, the communication device 110, the breaker device 120, and the ventilation device 130. The box is, for example, a rectangular parallelepiped box of 50 cm width, 60 cm depth, and 20 cm height. A solar absorption coefficient "a" of the box is determined from the material of the box. A surface heat transfer coefficient $\alpha$ of the box and an overall heat transfer coefficient U of the box are determined from the characteristics of the box and the wind velocity around the box. The sum of maximum power consumption values of the devices housed in the box is defined as a devices-heat-generation amount P. Catalog values of the maximum power consumption described in a catalog of the devices, for example, are employed as the maximum power consumption values of the devices. These parameters are used in performing the temperature estimation described later.

The data collection apparatus 10 may be installed indoors or may be installed outdoors. For example, the data collection apparatus 10 may be installed in a room in which the outdoor unit of the air conditioner 20 is installed or may be installed in the vicinity of the outdoor unit of the air conditioner 20. Further, in the case where the data collection apparatus 10 is installed outdoors, the sides of the box preferably face respectively the east, west, south, and north for estimation of a solar-radiation-induced penetration heal quantity described later. In the descriptions below, the sides of the box face the east, west, south, and north.

The server 30 receives the operation data of the air conditioner 20 from the data collection apparatus 10. The server 30 transmits to the data collection apparatus 10 meteorological data that is data relating to weather forecasting. The server 30 receives the meteorological data from, for example, a weather information providing server installed by a meteorological agency or private company. The meteorological data may be manually input into the server 30. The meteorological data includes weather data, wind velocity data, and solar radiation data.

The weather data is data indicating weather in a region in which the data collection apparatus 10 is installed, such as clear, clouds, rain, and snow. The weather data is used for determination on whether the data collection apparatus 10 is affected by rain or snow, as described later. The wind velocity data is data indicating wind velocity in the region in which the data collection apparatus 10 is installed. The wind velocity data is used to derive the surface heat transfer coefficient $\alpha$ of the box and the overall heat transfer coefficient U of the box.

The solar radiation data is data indicating an amount of solar radiation received by the horizontal plane and the vertical planes each facing the corresponding direction of the east, west, south, and north in the region where the data collection apparatus 10 is installed. This amount of solar radiation is an amount of global solar radiation.

Next, each device included in the data collection apparatus 10 is described.

The management device 100 collects the operation data from the air conditioner 20. The management device 100 transmits the collected operation data to the server 30 via the communication device 110. The management device 100 receives the meteorological data from the server 30 via the communication device 110.

The management device 100 estimates, based on the operation data and the meteorological data, an air temperature inside the data collection apparatus 10 as an estimated air temperature. The management device 100 transmits a command to the breaker device 120 in accordance with the estimated air temperature, thereby controlling running and stopping of the communication device 110 and controlling running and stopping of the ventilation device 130. The command includes a command to run the communication device 110, a command to stop the communication device 110, a command to run the ventilation device 130, and a command to stop the ventilation device 130.

The management device 100 can decrease the air temperature inside the data collection apparatus 10 by stopping the communication device 110. The management device 100 can decrease the air temperature inside the data collection apparatus 10 by running the ventilation device 130. The configuration and operation of the management device 100 are described later in detail.

The communication device 110 receives the operation data from the management device 100 and transmits the operation data to the server 30. The communication device 110 receives the meteorological data from the server 30 and transmits the meteorological data to the management device 100. Running and stopping of the communication device 110 are controlled by the management device 100 via the breaker device 120. The communication device 110 and the server 30 communicate with each other, for example, every few hours. The communication device 110 is an example of the communication means according to the present disclosure.

The communication device 110 is a device that is configured by, for example, a combination of a virtual private network (VPN) router and a long term evolution (LTE) router. In this case, a communication channel is established by a VPN between the communication device 110 and the server 30 via an LTE communication network, and the established VPN serves as the network NW.

When the air temperature inside the data collection apparatus 10 becomes high, the communication device 110 operates erroneously due to heat. The communication device 110 operates erroneously at an air temperature higher than, for example, 50° C. Hereinafter, an upper limit of the air temperature at which no erroneous operation occurs is referred to as an operable temperature. The operable temperatures of the management device 100, the breaker device 120, and the ventilation device 130 are higher than the operable temperature of the communication device 110. Further, the management device 100, the breaker device 120, and the ventilation device 130 do not operate erroneously at an air temperature when the communication device 110 stops and does not generate heat.

The breaker device 120, in accordance with the command received from the management device 100, controls the running and stopping of the communication device 110 and controls the running and stopping of the ventilation device 130. The breaker device 120 is, for example, a device that interconnects a power wire of the communication device 110 and a power wire of the ventilation device 130 and is configured to perform ON/OFF control of these power wires in accordance with the received command. In this case, the breaker device 120 switches the power wires to an ON state to run the devices to be controlled and switches the power wires to and an OFF state to stop the devices to be controlled.

The ventilation device 130 decreases the air temperature in the data collection apparatus 10 by performing ventilation of the data collection apparatus 10. The ventilation device 130 is, for example, a cooling fan arranged on an inside surface of the box. The ventilation device 130 may be a combination of a suction fan arranged on one inside surface and an exhaust fan arranged on another inside surface facing the one inside surface. Further, the ventilation device 130 may be an openable and closable shutter arranged on an inside surface. In this case, opening of the shutter corresponds to the running of the ventilation device 130, and closing of the shutter corresponds to the stopping of the ventilation device 130. In the below descriptions, the ventilation device 130 is a cooling fan. The ventilation device 130 is an example of the ventilation means according to the present disclosure.

Figure 2:
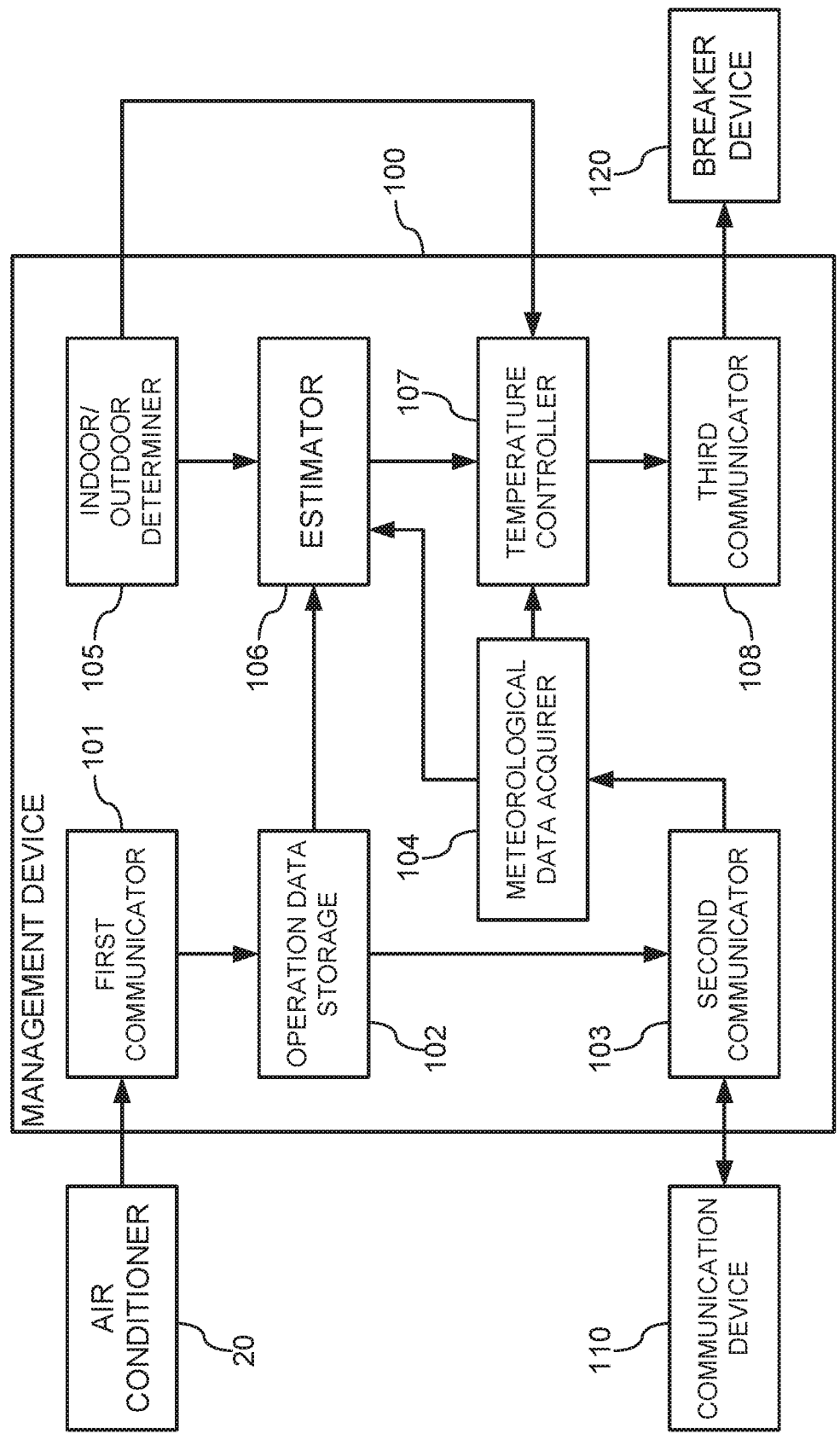
FIG. 2 illustrates a functional configuration of a management device according to the embodiment of the present disclosure.

Next, functional configuration of the management device 100 is described with reference to FIG. 2. The management device 100 includes a first communicator 101, an operation data storage 102, a second communicator 103, a meteorological data acquirer 104, an indoor/outdoor determiner 105, an estimator 106, a temperature controller 107, and a third communicator 108.

The first communicator 101 receives the operation data from the air conditioner 20 and transmits the received operation data to the operation data storage 102.

The operation data storage 102 stores the operation data received from the first communicator 101. The operation data storage 102 transmits the stored operation data to the second communicator 103. The operation data storage 102 transmits the stored operation data to the estimator 106.

The second communicator 103 receives the operation data from the operation data storage 102 and transmits the received operation data to the communication device 110. The second communicator 103 receives the meteorological data from the communication device 110 and transmits the received meteorological data to the meteorological data acquirer 104.

The meteorological data acquirer 104 acquires the meteorological data by receiving the meteorological data from the second communicator 103. The meteorological data acquirer 104 transmits the acquired meteorological data to the estimator 106 and the temperature controller 107. The meteorological data acquirer 104 is an example of the meteorological data acquisition means and the solar radiation data acquisition means according to the present disclosure.

The indoor/outdoor determiner 105 determines whether the data collection apparatus 10 is installed indoors or is installed outdoors. The indoor/outdoor determiner 105 transmits, to the estimator 106 and the temperature controller 107, indoor/outdoor data indicating whether the data collection apparatus 10 is installed indoors or is installed outdoors.

The indoor/outdoor determiner 105 is connected to, for example, a dip switch arranged on the outer wall of the management device 100. The indoor/outdoor determiner 105, according to ON/OFF state of the dip switch, determines whether the data collection apparatus 10 is installed indoors or is installed outdoors. When installing the data collection apparatus 10, an installer of the data collection apparatus 10 sets the dip switch to the ON-state or OFF-state according to the installation position of the data collection apparatus 10.

Furthermore, the indoor/outdoor determiner 105 may make the determination using indoor/outdoor data that is stored in a memory card inserted into the management device 100. In this case, when installing the data collection apparatus 10, the installer of the data collection apparatus 10 inserts into the management device 100 a memory card storing the indoor/outdoor data corresponding to the installation position.

Furthermore, the indoor/outdoor determiner 105 may make the determination using the indoor/outdoor data received from the server 30 via the communication device 110 and the second communicator 103. In this case, the installer of the data collection apparatus 10, when installing the data collection apparatus 10, inputs into the server 30 the indoor/outdoor data corresponding to the installation position.

The estimator 106 receives the operation data from the operation data storage 102. The estimator 106 receives the meteorological data from the meteorological data acquirer 104. The estimator 106 receives the indoor/outdoor data from the indoor/outdoor determiner 105. The estimator 106 holds surface-heat-transfer-coefficient data indicating a relationship between the wind velocity around the box and the surface heat transfer coefficient $\alpha$ and overall-heat-transfer-coefficient data indicating a relationship between the wind velocity around the box and the overall heat transfer coefficient U. The estimator 106 estimates the air temperature inside the data collection apparatus 10 as an estimated air temperature, based on the indoor/outdoor data, the operation data, the meteorological data, the surface-heat-transfer-coefficient data and the overall-heat-transfer-coefficient data. Details of estimation of the air temperature are described later together with descriptions relating to the operation. The estimator 106 transmits, to the temperature controller 107, air temperature data indicating the estimated air temperature. The estimator 106 is an example of the estimation means according to the present disclosure.

The temperature controller 107 receives the meteorological data from the meteorological data acquirer 104. The temperature controller 107 receives the indoor/outdoor data from the indoor/outdoor determiner 105. The temperature controller 107 receives the air temperature data from the estimator 106. The temperature controller 107 generates the command for the breaker device 120, based on the indoor/outdoor data, the meteorological data and the air temperature data. Generation of the command is described later together with descriptions relating to the operation. The temperature controller 107 transmits the generated command to the third communicator 108. The temperature controller 107 transmits the command to the breaker device 120 via the third communicator 108, thereby enabling stopping of the operation of the communication device 110 or running of the ventilation device 130. As a result, the air temperature inside the data collection apparatus 10 can be decreased. The temperature controller 107 is an example of the temperature control means according to the present disclosure.

The third communicator 108 receives the command from the temperature controller 107 and transmits the received command to the breaker device 120.

Figure 3:
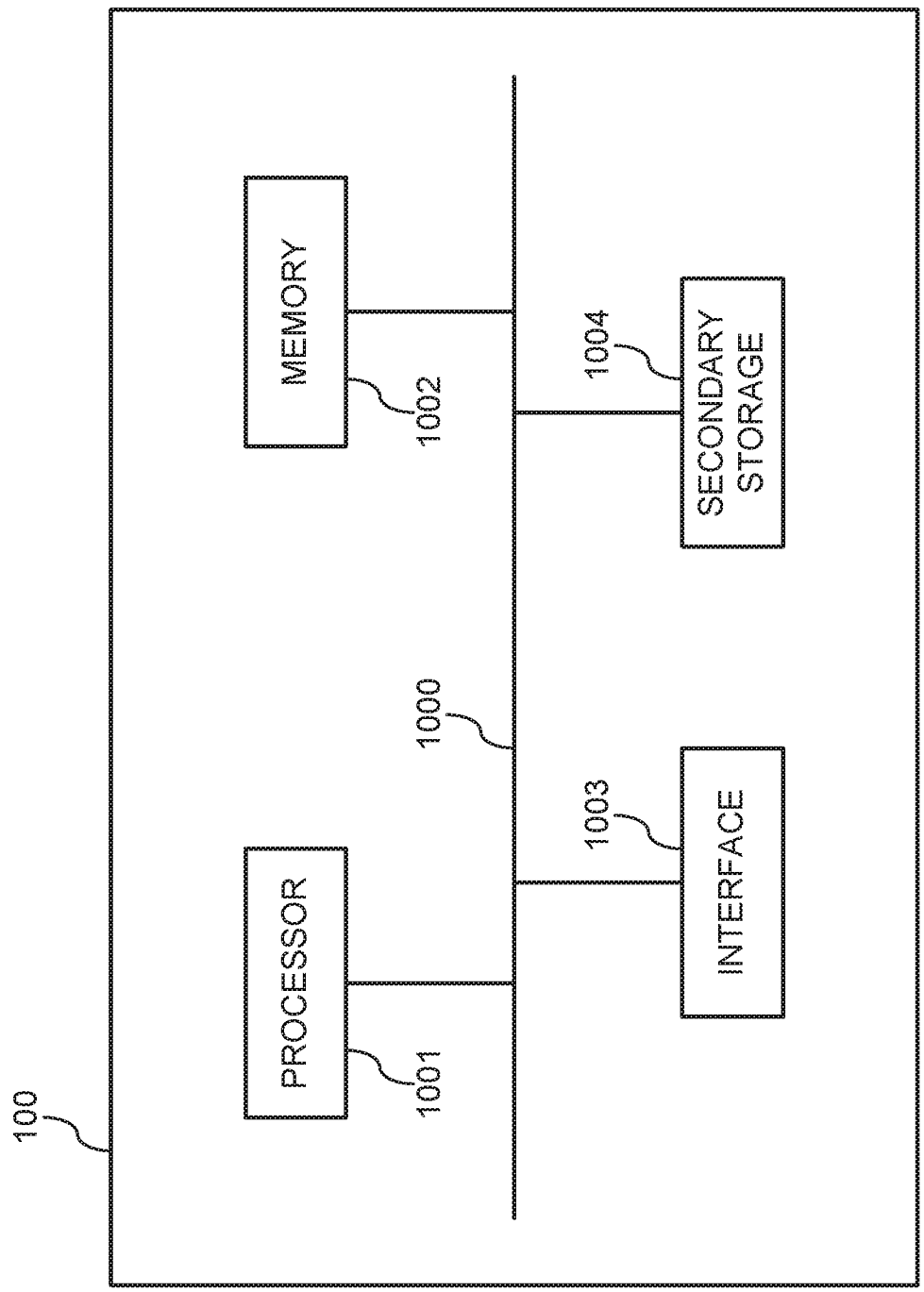
FIG. 3 illustrates an example hardware configuration of the management device according to the embodiment of the present disclosure.

Next, an example hardware configuration of the management device 100 is described with reference to FIG. 3. The management device 100 illustrated in FIG. 3 is achieved by a computer, such as a micro controller and a personal computer.

The management device 100 includes a processor 1001, a memory 1002 an interface 1003, and a secondary storage 1004 that are connected to one another via a bus 1000.

The processor 1001 is, for example, a central processing unit (CPU). The processor 1001 loads, into the memory 1002, a dedicated program stored in the secondary storage 1004 and executes the program to achieve each function of the management device 100.

The memory 1002 is a main storage that includes, for example, random access memory (RAM). The memory 1002 stores the dedicated program loaded by the processor 1001 from the secondary storage 1004. Further, the memory 1002 functions as a working memory to be used in executing by the processor 1001 the dedicated program.

The interface 1003 is an input/output (I/O) port, such as a serial port, a universal serial bus (USB) port, and a network port.

The secondary storage 1004 is, for example, a flash memory, a hard disk drive (HDD), and a solid state drive (SSD). The secondary storage 1004 stores the dedicated program to be executed by the processor 1001. The secondary storage 1004 functions as a storage to be used in storing the operation data by the operation data storage 102.

In the hardware configuration illustrated in FIG. 3, the management device 100 includes the secondary storage 1004. However, this configuration is not limiting. A configuration in which (i) the secondary storage 1004 is provided at the exterior of the management device 100 and (ii) the management device 100 and the secondary storage 1004 are connected via the interface 1003, may be employed. In employing this configuration, a removable media, such as a USB flash drive and a memory card, may be used as the secondary storage 1004.

The management device 100 can be achieved, instead of by the hardware components illustrated in FIG. 3, by a dedicated circuit including, for example, an application specific integrated circuit (ASIC) or a field programmable gate array (FPGA). Further, in employing the hardware configuration illustrated in FIG. 3, a part of the functions of the management device 100 may be achieved by, for example, a dedicated circuit connected to the interface 1003.

Figure 4:
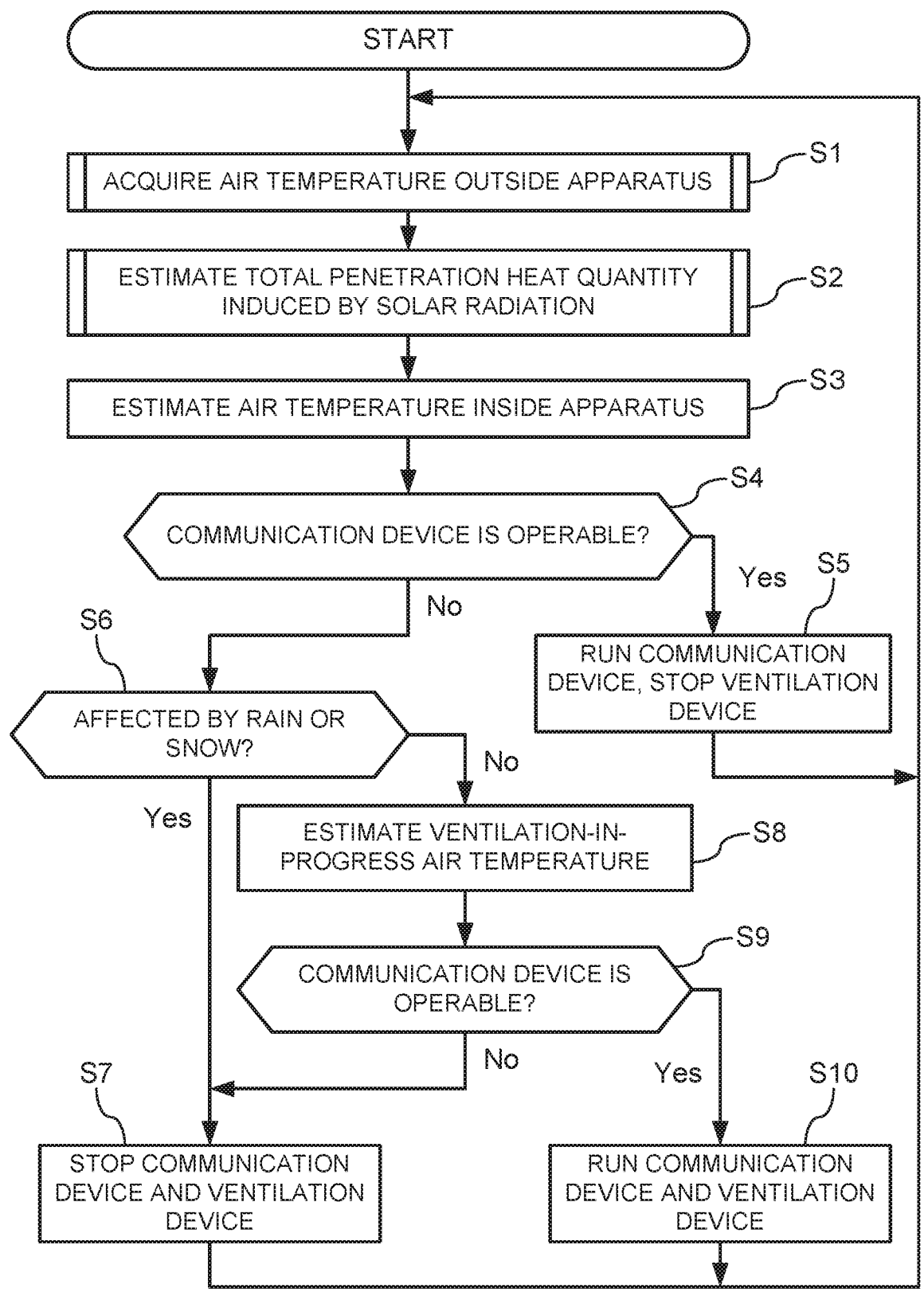
FIG. 4 illustrates an example flowchart of processing, performed by the management device according to the embodiment of the present disclosure, for decreasing an air temperature inside a data collection apparatus.

Next, operation by the management device 100 that decreases the air temperature inside the data collection apparatus 10 is described with reference to FIG. 4. First, the management device 100 acquires, using the estimator 106, an air temperature outside the data collection apparatus 10 (step S1).

Figure 5:
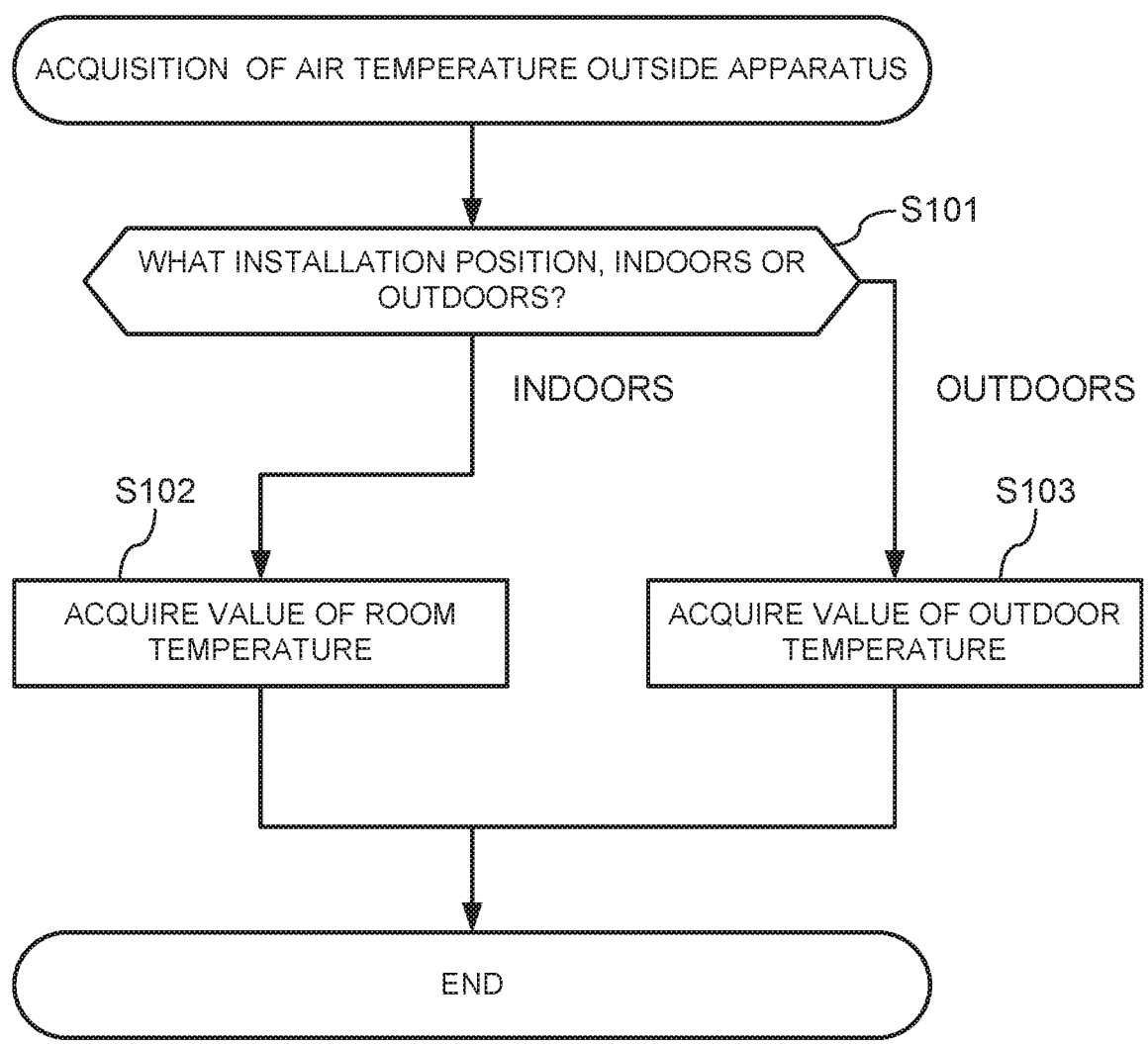
FIG. 5 illustrates an example flowchart of processing for acquiring an air temperature outside the data collection apparatus according to the embodiment of the present disclosure.

Acquisition of the air temperature T outside the data collection apparatus 10 is described with reference to FIG. 5. The estimator 106 receives the indoor/outdoor data from the indoor/outdoor determiner 105 and determines whether the data collection apparatus 10 is installed indoors or installed outdoors (step S101). When a determination is made that the data collection apparatus 10 is installed indoors ("indoors" in step S101), the estimator 106 receives current operation data from the operation data storage 102 and acquires a value of the room temperature included in the operation data as the air temperature T outside the data collection apparatus 10 (step S102). When a determination is made that the data collection apparatus 10 is installed outdoors ("outdoors" in step S101), the estimator 106 receives current operation data from the operation data storage 102 and acquires, as the air temperature T outside the data collection apparatus 10, a value of the outdoor temperature included in the operation data (step S103).

Next, again with reference to FIG. 4, the management device 100 estimates, using the estimator 106, a total penetration heat quantity $\Sigma P_i$ that is a quantity of heat induced by solar radiation and penetrating into the data collection apparatus 10 (step S2).

Figure 6:
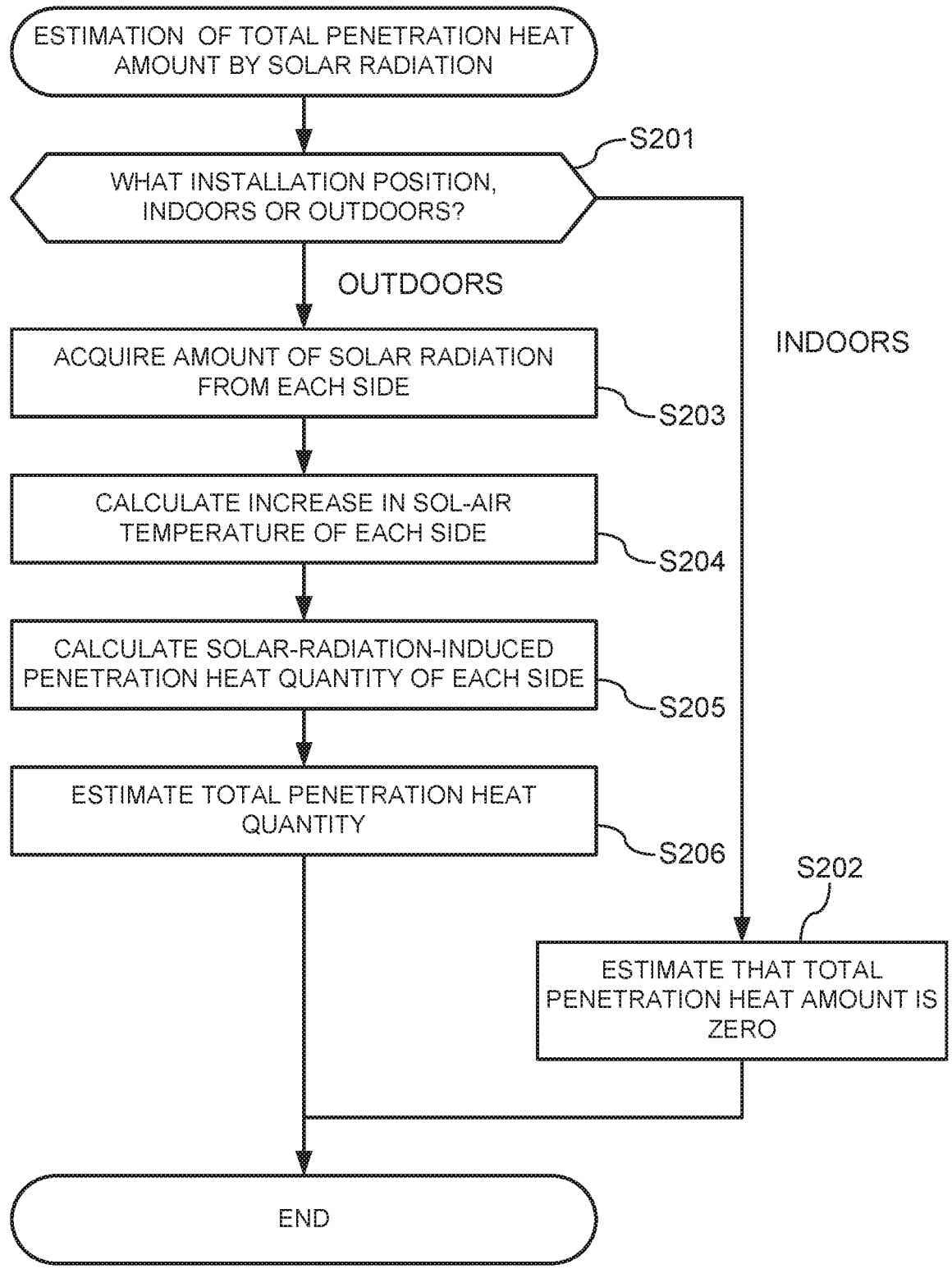
FIG. 6 illustrates an example flowchart of processing for estimating a total penetration heat quantity induced by solar radiation.

Estimation of the total penetration heat quantity $\Sigma P_i$ induced by solar radiation is described with reference to FIG. 6. The estimator 106 receives the indoor/outdoor data from the indoor/outdoor determiner 105 and determines whether the data collection apparatus 10 is installed indoors or installed outdoors (step S201). When a determination is made that the data collection apparatus 10 is installed indoors ("indoors" in step S201), the estimator 106 estimates that the total penetration heat quantity $\Sigma P_i$ is zero (step S202).

When a determination is made that the data collection apparatus 10 is installed outdoors "outdoors" in step S201), the estimator 106 receives the meteorological data from the meteorological data acquirer 104 and acquires, based on the solar radiation data included in the meteorological data, an amount of solar radiation on each side of the box included in the data collection apparatus 10 (step S203). As the bottom side of the box does not receive solar radiation, acquisition of the solar radiation amount is performed for the five sides other than the bottom side.

As described above, the solar radiation data includes data that indicates, for the horizontal plane and each of the vertical planes facing respectively the direction of the east, west, south, and north, an amount of direct solar radiation and amount of global solar radiation. Further, as described above, the various sides of the box face the east, west, south, and north. Accordingly, an amount of solar radiation on the top side and each side of the box can be acquired. Hereinafter, the various sides of the box are termed the east side, west side, south side, or north side in accordance with the direction faced by the side.

Hereinafter, the amount of solar radiation on the top side is expressed by $I^t$, the amount of solar radiation on the south side is expressed by $I^s$, the amount of solar radiation on the north side is expressed by $I^n$, the amount of solar radiation on the east side is expressed by $I^e$, and the amount of solar radiation on the west side is expressed by $I^w$.

Then the estimator 106 calculates an increase in a sol-air temperature of each side (step S204). The increase in the sol-air temperature of the top side is expressed by $\Delta Tm^t$, the increase in the sol-air temperature of the south side is expressed by $\Delta Tm^s$, the increase in the sol-air temperature of the north side is expressed by $\Delta Tm^n$, the increase in the sol-air temperature of the east side is expressed by $\Delta Tm^e$, and the increase in the sol-air temperature of the west side is expressed by $\Delta Tm^w$. As described above, the solar absorption coefficient "a" of the box is a known value. Further, the estimator 106 refers to the surface-heat-transfer-coefficient data and calculates the surface heat transfer coefficient $\alpha$ of the box based on the wind velocity data included in the received meteorological data. The surface heat transfer coefficient $\alpha$ has become a known value, and thus the increase in the sol-air temperature of each side can be calculated using the formulas below.

$$\Delta Tm^t = I^t \times a/\alpha$$

$$\Delta Tm^s = I^s \times a/\alpha$$

$$\Delta Tm^n = I^n \times a/\alpha$$

$$\Delta Tm^e = I^e \times a/\alpha$$

$$\Delta Tm^w = I^w \times a/\alpha$$

Then the estimator 106 calculates, for each side, the solar-radiation-induced penetration heat quantity (step S205). The solar-radiation-induced penetration heat quantity of the top side is expressed by $Pi^t$, the solar-radiation-induced penetration heat quantity of the south side is expressed by $Pi^s$, the solar-radiation-induced penetration heat quantity of the north side is expressed by $Pi^n$, the solar-radiation-induced penetration heat quantity of the east side is expressed by $Pi^e$, and the solar-radiation-induced penetration heat quantity of the west side is expressed by $Pi^w$. The surface areas of the sides (expressed by $S^t$, $S^s$, $S^n$, $S^e$, and $S^w$, respectively) are each a known value. The estimator 106 refers to the heat-transfer-coefficient data and calculates the overall heat transfer coefficient U of the box based on the wind velocity data included in the received meteorological data. The overall heat transfer coefficient U has become a known value, and thus the solar-radiation-induced penetration heat quantity of each side can be calculated using the formulas below.

$$Pi^t = U \times S^t \times \Delta Tm^t$$

$$Pi^s = U \times S^s \times \Delta Tm^s$$

$$Pi^n = U \times S^n \times \Delta Tm^n$$

$$Pi^e = U \times S^e \times \Delta Tm^e$$

$$Pi^w = U \times S^w \times \Delta Tm^w$$

Then the estimator 106 estimates, as the sum of solar-radiation-induced penetration heat quantities of the sides, the total penetration heat quantity $\Sigma Pi$ induced by solar radiation (step S206). That is to say, this quantity is expressed as follows:

$$\Sigma Pi = Pi^t + Pi^s + Pi^n + Pi^e + Pi^w$$

Again with reference to FIG. 4, the management device 100 estimates, using the estimator 106, an air temperature T1 that is an estimated temperature inside the data collection apparatus 10 (step S3). First, the estimator 106 calculates an air temperature increase value ΔT inside the data collection apparatus 10 using the formula below.

$$\Delta T = (P + \Sigma Pi)/(U \times \Sigma S)$$

In this formula, ΣS is the sum of the surface areas of the sides other than the bottom side, P corresponds to the devices-heat-generation amount P that indicates the sum of maximum power consumption values of the devices housed in the box as described above, and U corresponds to the overall heat transfer coefficient U described above. Then estimation of the air temperature T1 inside the data collection apparatus 10 is performed by adding the air temperature increase value ΔT to the air temperature T outside the apparatus that is acquired in step S. This is expressed by the following formula: T1=T+ΔT. The air temperature T1 estimated in this step is an air temperature inside the data collection apparatus 10 that is estimated in the case in which each device included in the data collection apparatus 10 operates at maximum power consumption and the ventilation performed by the ventilation device 130 is not taken into consideration.

The management device 100 determines, using the temperature controller 107, whether the communication device 110 is operable at the air temperature T1 inside the data collection apparatus 10 that is estimated in step S3 (step S4).

To make this determination, the temperature controller 107 acquires from the estimator 106 the air temperature data indicating the air temperature T1 and determines whether the air temperature T1 is lower than or equal to the operable temperature of the communication device 110. The operable temperature of the communication device 110 is an example of the reference value according to the present disclosure.

When a determination is made that the communication device 110 is operable (YES in step S4), decreasing the air temperature inside the data collection apparatus 10 is not required. In such a case, the management device 100, using the temperature controller 107, performs control to run the communication device 110 and to stop the ventilation device 130 (step S5). To perform this control, the temperature controller 107 transmits, to the breaker device 120, a command to run the communication device 110 and a command to stop the ventilation device 130. Then the management device 100 repeats the operations of step S1 and beyond.

In the case where the temperature controller 107 attempts to control an already-naming device to run or in the case where the temperature controller 107 attempts to control an already-stopped device to stop, the breaker device 120 does not control such devices at all. However, for simplification, the operations performed in these cases are also expressed as "running" and "stopping".

When a determination is made that the communication device 110 is not operable (NO in step S4), decreasing the air temperature inside the data collection apparatus 10 is required. First, the management device 100 determines, using the temperature controller 107, whether the data collection apparatus 10 is affected by rain or snow (step S6). Firstly, the temperature controller 107 receives the indoor/outdoor data from the indoor/outdoor determiner 105 and determines whether the data collection apparatus 10 is installed indoors or installed outdoors. Then the temperature controller 107 receives the meteorological data from the meteorological data acquirer 104 and determines whether the weather data included in the meteorological data indicates rain or snow. When determining that, as a result of these determinations, the data collection apparatus 10 is installed outdoors and that the weather is rain or snow, the temperature controller 107 determines that the data collection apparatus 10 is affected by rain or snow.

When a determination is made that the data collection apparatus 10 is affected by rain or snow (YES in step S6), running of the ventilation device 130 in this case may cause intrusion of water into the data collection apparatus 10, and thus the management device 100 is required to decrease the air temperature inside the data collection apparatus 10 by stopping the communication device 110. In this case, the management device 100, using the temperature controller 107, performs control to stop the communication device 110 and the ventilation device 130 (step S7). To perform this control, the temperature controller 107 transmits, to the breaker device 120, a command to stop the communication device 110 and a command to stop the ventilation device 130. Then the management device 100 repeats the operations of step S1 and beyond.

When a determination is made that the data collection apparatus 10 is not affected by rain or snow (NO in step S6), the management device 100 can decrease the air temperature inside the data collection apparatus 10 by running the ventilation device 130. In this case, the management device 100, using the estimator 106, estimates an air temperature T2 that is an air temperature inside the data collection apparatus 10 after performing running of the ventilation device 130 (step S8). Hereinafter, this air temperature T2 is referred to as a ventilation-in-progress air temperature T2. The estimator 106 estimates the ventilation-in-progress air temperature T2 using the formula below.

$$T2=T1-P/(K \times QF + U \times \Sigma S)$$

In this formula, QF is air volume from the ventilation device 130 that is a cooling fan, and K is a coefficient that is determined according to the ventilation device 130 that is a cooling fan. An example value of K is 20.

Then the management device 100 determines, using the temperature controller 107, whether the communication device 110 is operable at the ventilation-in-progress air temperature T2 estimated in step S8 (step S9). To make this determination, the temperature controller 107 acquires from the estimator 106 air temperature data indicating the ventilation-in-progress air temperature T2 and determines whether the ventilation-in-progress air temperature T2 is lower than or equal to the operable temperature of the communication device 110.

When a determination is made that the communication device 110 is operable (YES in step S9), decreasing the air temperature inside the data collection apparatus 10 by running the ventilation device 130 allows the communication device 110 to operate. In this case, the management device 100, using the temperature controller 107, performs control to run the communication device 110 and the ventilation device 130 (step S10). To perform this control, the temperature controller 107 transmits, to the breaker device 120, a command to run the communication device 110 and a command to run the ventilation device 130. Then the management device 100 repeats the operations of step S1 and beyond.

When a determination is made that the communication device 110 is not operable (NO in step S9), the communication device 110 is not made operable by decreasing the air temperature inside the data collection apparatus 10 by running the ventilation device 130. Thus, stopping the communication device 110 is required whereas running the ventilation device 130 is not required. In this case, the management device 100, using the temperature controller 107, performs control to stop the communication device 110 and the ventilation device 130 (step S7). Then the management device 100 repeats the operations of step S1 and beyond.

The operation by the management device 100 of decreasing the air temperature inside the data collection apparatus 10 is described above. In summary, the management device 100 estimates the air temperature inside the data collection apparatus 10, and when the estimated air temperature is higher than a reference value that is the operable temperature of the communication device 110, the management device 100 performs control to decrease the air temperature inside the data collection apparatus 10.

The data collection system 1 according to an embodiment is described above. According to the data collection system 1, the air temperature inside the data collection apparatus 10 is estimated, and when the estimated air temperature is higher than a reference value, the air temperature inside the data collection apparatus 10 is decreased. This enables control of the air temperature inside the data collection apparatus 10 without installation of a temperature sensor in the data collection apparatus 10.

Modified Example

The embodiment described above is an embodiment in which the sides of the box preferably face the east, west, south, and north for estimation of the solar-radiation-induced penetration heat quantities. However, even when the box is oriented freely, estimation of the solar-radiation-induced penetration heat quantities can be achieved when employing a configuration as in the described below example. The data collection apparatus 10 includes a geomagnetic sensor. The management device 100 determines the orientation of the box based on a detection result obtained by the geomagnetic sensor. The server 30 is configured to acquire the solar radiation data using a service that allows acquisition of an amount of solar radiation corresponding to a freely selected direction. The management device 100 receives, from the server, meteorological data including solar radiation data corresponding to the orientation of the box.

The server 30 may transmit meteorological data that does not include solar radiation data In employing this configuration, the management device 100 performs temperature estimation using a known amount of solar radiation assumed in the case of strong solar radiation. The "amount of solar radiation assumed in the case of strong solar radiation" is, for example, an amount of solar radiation at 14 o'clock on a clear day in July. Further, the management device 100 may determine whether to use an amount of solar radiation according to the current time.

The server 30 may transmit meteorological data that does not include wind velocity data. In employing this configuration, the estimator 106 may, instead of referring to the surface-heat-transfer-coefficient data and the heat-transfer-coefficient data, perform temperature estimation based on the premise that the surface heat transfer coefficient α is 10 and the overall heat transfer coefficient U is 5.0.

In the above-described embodiment, the amount of global solar radiation is used as an amount of solar radiation. However, a configuration may be employed in which an amount of diffuse solar radiation is used when the data collection apparatus 10 is installed in the shade, and an amount of global solar radiation is used as an amount of solar radiation when the data collection apparatus 10 is installed in a sunny place. Such a configuration can be employed when employing a configuration in which the management device 100 includes a functional element to determine whether the data collection apparatus 10 is installed in the shade or installed in a sunny place, and the server 30 acquires solar radiation data including the amount of diffuse solar radiation.

Although the weather data is used to determine whether the data collection apparatus 10 is affected by rain or snow in the above-described embodiment, precipitation probability included in the meteorological data may be used instead of the weather data, to determine whether the data collection apparatus 10 is affected by rain or snow. For example, the data collection apparatus 10 determines that the data collection apparatus 10 is affected by rain or snow when the data collection apparatus 10 is installed outdoors and the precipitation probability is higher than or equal to 30%.

The program used in the management device 100 can be distributed by storing the program in a computer-readable recording medium, such as a compact disc read only memory (CD-ROM), a digital versatile disc (DVD), a USB flash drive, a memory card, and HDD. Further, installing such a program in a special-purpose computer or a general-purpose computer can cause the computer to function as the management device 100.

Furthermore, the above-described program may be stored in a storage included in another server on the Internet and may be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for a data collection apparatus that collects operation data of an air conditioner.

REFERENCE SIGNS LIST

1 Data collection system
10 Data collection apparatus
20 Air conditioner
30 Server
100 Management device
101 First communicator
102 Operation data storage
103 Second communicator
104 Meteorological data acquirer
105 Indoor/outdoor determiner
106 Estimator
107 Temperature controller
108 Third communicator
110 Communication device
120 Breaker device
130 Ventilation device
1000 Bus
1001 Processor
1002 Memory
1003 Interface
1004 Secondary storage
NW Network

The invention claimed is:

1. A data collection apparatus for collecting operation data of an air conditioner, comprising:
at least one processor and/or at least one circuit;
a communicator including network interface hardware, configured to communicate with a server; and
a ventilator comprising at least one fan and/or at least one openable and closable shutter, configured to ventilate the data collection apparatus; wherein
the at least one processor and/or at least one circuit is configured to
estimate, utilizing current data which excludes data collection apparatus interior temperature sensor data, an estimated air temperature that is an air temperature inside the data collection apparatus without ventilation being performed;
estimate, utilizing the current data, a ventilation-in-progress air temperature that is an air temperature inside the data collection apparatus with ventilation being performed; and
when the estimated air temperature is determined to be higher than a reference value which represents a predefined operable temperature of the communicator:
(i) decrease the air temperature inside the data collection apparatus by stopping operation of the communicator, when the ventilation-in-progress air temperature is determined to be higher than the reference value, and
(ii) decrease the air temperature inside the data collection apparatus by controlling the ventilator to ventilate, when the ventilation-in-progress air temperature is determined to be lower than or equal to the reference value.

2. The data collection apparatus according to claim 1, wherein the at least one processor and/or at least one circuit is further configured to estimate the air temperature inside the data collection apparatus based on the operation data.

3. The data collection apparatus according to claim 1, wherein the at least one processor and/or at least one circuit is further configured to
acquire meteorological data, and
estimate the air temperature inside the data collection apparatus based on the meteorological data.

4. The data collection apparatus according to claim 1, wherein the at least one processor and/or at least one circuit is further configured to
acquire solar radiation data, and
estimate the air temperature inside the data collection apparatus by estimating, based on the solar radiation data, a quantity of heat induced by solar radiation and penetrating into the data collection apparatus.

5. A data collection system comprising:
the data collection apparatus according to claim 1; and
the air conditioner, wherein
the data collection apparatus collects the operation data of the air conditioner.

6. The data collection system according to claim 1, wherein the at least one processor and/or at least one circuit is further configured to
acquire meteorological data from the server, and
the estimator estimates the air temperature inside the data collection apparatus based on the meteorological data acquired from the server.

7. The data collection apparatus according to claim 1, wherein
at least the at least the at least one processor and/or at least one circuit and the ventilator are housed within a box that configures the data collection apparatus.

* * * * *